(12) United States Patent
Ekonen et al.

(10) Patent No.: US 8,313,407 B2
(45) Date of Patent: *Nov. 20, 2012

(54) POWER TAKE-OFF UNIT WITH ACTIVE COUPLING AND HYPOID DISCONNECT SYSTEM

(75) Inventors: Todd Ekonen, Howell, MI (US); Bradley Larkin, Shelby Township, MI (US)

(73) Assignee: MAGNA Powertrain USA, Inc., Troy, MI (US)

( * ) Notice: Subject to any disclaimer, the term of this patent is extended or adjusted under 35 U.S.C. 154(b) by 619 days.

This patent is subject to a terminal disclaimer.

(21) Appl. No.: 12/553,371

(22) Filed: Sep. 3, 2009

(65) Prior Publication Data

US 2010/0062891 A1 Mar. 11, 2010

Related U.S. Application Data

(60) Provisional application No. 61/095,351, filed on Sep. 9, 2008.

(51) Int. Cl.
 *F16H 48/20* (2006.01)
 *B60K 17/354* (2006.01)
 *B60K 23/08* (2006.01)
 *B60K 17/344* (2006.01)
 *B60K 17/35* (2006.01)

(52) U.S. Cl. ........ 475/223; 180/245; 180/247; 180/248; 180/249

(58) Field of Classification Search .................. 475/223; 180/245–249
See application file for complete search history.

(56) References Cited

U.S. PATENT DOCUMENTS

| | | | |
|---|---|---|---|
| 5,086,867 A | 2/1992 | Hirota et al. | |
| 5,119,900 A | 6/1992 | Watanabe et al. | |
| 5,407,024 A | 4/1995 | Watson et al. | |
| 5,485,894 A | 1/1996 | Watson et al. | |
| 5,609,219 A | 3/1997 | Watson et al. | |
| 5,701,247 A | 12/1997 | Sasaki | |
| 5,890,989 A * | 4/1999 | Yamazaki et al. | 475/295 |
| 5,954,150 A | 9/1999 | Miller et al. | |
| 6,000,488 A | 12/1999 | Atkinson | |
| 6,062,330 A | 5/2000 | Watson et al. | |
| 6,145,614 A * | 11/2000 | Kimura et al. | 180/248 |
| 6,263,995 B1 | 7/2001 | Watson et al. | |
| 6,553,303 B2 * | 4/2003 | Matsuno | 701/67 |
| 7,096,990 B2 | 8/2006 | Borgen et al. | |
| 7,325,640 B2 * | 2/2008 | Ushiroda et al. | 180/248 |
| 7,390,278 B2 | 6/2008 | Krisher | |
| 7,553,250 B2 * | 6/2009 | Sachsenmaier | 475/199 |
| 2003/0040394 A1 | 2/2003 | Palazzolo | |
| 2003/0085068 A1 | 5/2003 | Bowen et al. | |
| 2005/0054471 A1 | 3/2005 | Fleytman | |

FOREIGN PATENT DOCUMENTS

DE 3814435 11/1988
(Continued)

*Primary Examiner* — Tisha Lewis
(74) *Attorney, Agent, or Firm* — Harness, Dickey & Pierce, P.L.C.

(57) ABSTRACT

A vehicle drive train for transferring torque to first and second sets of wheels includes a first driveline adapted to transfer torque to the first set of wheels and a first power disconnection device. A second driveline is adapted to transfer torque to the second set of wheels and includes a second power disconnection device. A hypoid gearset is positioned within one of the first driveline and the second driveline in a power path between the first and second power disconnection devices. The hypoid gearset is selectively disconnected from being driven by either of the first driveline and the second driveline when the first and second power disconnection devices are operated in a disconnected, non-torque transferring, mode.

16 Claims, 14 Drawing Sheets

FOREIGN PATENT DOCUMENTS

| | | |
|---|---|---|
| DE | 3801351 | 8/1989 |
| DE | 3822518 | 1/1990 |
| JP | 60135327 | 7/1985 |
| WO | WO2005/035295 | 4/2005 |

* cited by examiner

POWER TAKE-OFF UNIT WITH ACTIVE COUPLING AND HYPOID DISCONNECT SYSTEM

CROSS-REFERENCE TO RELATED APPLICATIONS

This application claims the benefit of U.S. Provisional Application No. 61/095,351, filed on Sep. 9, 2008. The entire disclosure of the above application is incorporated herein by reference.

FIELD

The present disclosure relates to a driveline for a motor vehicle having a system for disconnecting a hypoid ring gear from rotating at driveline speed. In particular, a power take-off unit includes a coupling for ceasing the transfer of torque from a power source to the hypoid ring gear while another disconnect selectively interrupts the flow of power from a vehicle wheel to the hypoid ring gear on the secondary driveline.

BACKGROUND

Typical power take-off units transfer power from a transaxle in receipt of torque from a vehicle power source. The power take-off unit transfers power to a propeller shaft through a gear arrangement that typically includes a hypoid cross-axis gearset. Other gear arrangements such as parallel axis gears may be provided within the power take-off unit to provide additional torque reduction.

Power take-off units have traditionally been connected to the transaxle output differential. Accordingly, at least some of the components of the power take-off unit rotate at the transaxle differential output speed. Power losses occur through the hypoid gear churning through a lubricating fluid. Efficiency losses due to bearing preload and gear mesh conditions are also incurred while the components of the power take-off unit are rotated.

Similar energy losses occur when other driveline components are rotated. For example, many rear driven axles include hypoid gearsets having a ring gear at least partially immersed in a lubricating fluid. In at least some full-time all-wheel drive configurations, the rear drive axle hypoid gearset continuously rotates during all modes of operation and transmits a certain level of torque. In other applications, the rear axle hypoid gearset still rotates but with out the transmission of torque whenever the vehicle is moving. Regardless of the particular configuration, churning losses convert energy that could have been transferred to the wheels into heat energy that is not beneficially captured by the vehicle. As such, an opportunity may exist to provide a more energy efficient vehicle driveline.

SUMMARY

A vehicle drive train for transferring torque to first and second sets of wheels includes a first driveline adapted to transfer torque to the first set of wheels and a first power disconnection device. A second driveline is adapted to transfer torque to the second set of wheels and includes a second power disconnection device. A hypoid gearset is positioned within one of the first driveline and the second driveline in a power path between the first and second power disconnection devices. The hypoid gearset is selectively disconnected from being driven by either of the first driveline and the second driveline when the first and second power disconnection devices are operated in a disconnected, non-torque transferring, mode.

In addition, a vehicle drive train for transferring torque from a power source to first and second sets of wheels is disclosed. A first driveline is adapted to transfer torque from the power source to the first set of wheels and includes a power take-off unit. The power take-off unit includes a hypoid gearset and a first power disconnection device selectively ceasing the transfer of torque to the hypoid gearset. A second driveline is in receipt of torque from the hypoid gearset. The second driveline transfers torque to the second set of wheels and includes a second power disconnection device selectively interrupting a transfer of torque from the second set of wheels to the hypoid gearset.

In another form, a vehicle drive train for transferring torque from a power source to a first pair and a second pair of wheels is provided. The vehicle drive train includes a first power transmission device adapted to transfer torque from the power source to the first pair of wheels. The first power transmission device includes a first hypoid gearset and a first power disconnection device selectively ceasing the transfer of torque to the first hypoid gearset. A second power transmission device is in receipt of torque from the first hypoid gearset and transfers torque to the second pair of wheels. The second power transmission device includes a second hypoid gearset, a second power disconnection device selectively interrupting a transfer of torque from one of the wheels to the second hypoid gearset, and a third power disconnection device selectively interrupting a transfer of torque from the other of second wheels to the second hypoid gearset.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
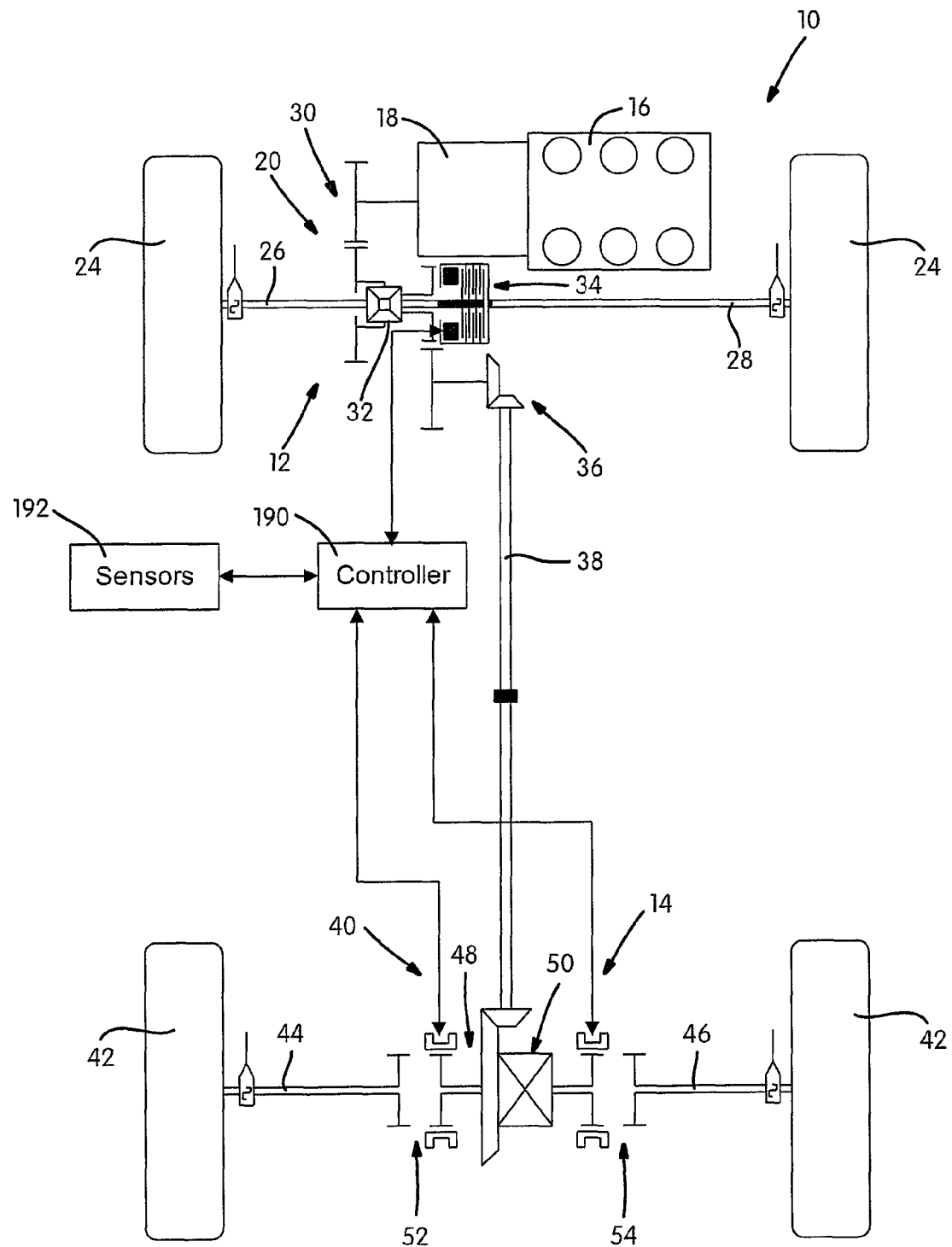
FIG. 1 is a schematic of an exemplary vehicle equipped with a vehicle drive train of the present disclosure.

The following description is merely exemplary in nature and is not intended to limit the present disclosure, application, or uses. It should be understood that throughout the drawings, corresponding reference numerals indicate like or corresponding parts and features.

In general, the present disclosure relates to a coupling and hypoid disconnect system for a driveline of a motor vehicle. A power take-off unit may be equipped with an active coupling or a dog clutch/synchronizer to disconnect the power source from a portion of the driveline and to reconnect through synchronization of said driveline. Additionally, another active coupling or dog clutch may be provided to disconnect a portion of the driveline from the vehicle wheels. The hypoid gearing of the vehicle driveline may be separated from the driving source of power to reduce churning losses and other mechanical inefficiencies.

With particular reference to FIG. 1 of the drawings, a drive train 10 of a four-wheel drive vehicle is shown. Drive train 10 includes a front driveline 12 and a rear driveline 14 both drivable from a source of power, such as an engine 16 through a transmission 18 which may be of either the manual or automatic type. In the particular embodiment shown, drive train 10 is a four-wheel system incorporating a power transmission device 20 for transmitting drive torque from engine 16 and transmission 18 to front driveline 12 and rear driveline 14. Power transmission device 20 is shown as a power take-off unit.

Front driveline 12 is shown to include a pair of front wheels 24 individually driven by a first axle shaft 26 and a second axle shaft 28. Front driveline 12 also includes a reduction speed gearset 30 and a differential assembly 32. Power transmission device 20 includes an active clutch 34 and a right-angled drive assembly 36.

Rear driveline 14 includes a propeller shaft 38 connected at a first end to right-angled drive assembly 36 and at an opposite end to a rear axle assembly 40. Rear driveline 14 also includes a pair of rear wheels 42 individually driven by a first rear axle shaft 44 and a second rear axle shaft 46. Rear axle assembly 40 also includes a hypoid ring and pinion gearset 48 driving a differential assembly 50.

First and second disconnects 52, 54 selectively drivingly disconnect first and second rear axle shafts 44, 46 from ring and pinion gearset 48 and differential assembly 50. First and second disconnects 52, 54 may be configured as dog clutches, synchronized clutches, roller clutches or another torque transferring disconnection mechanism. If speed synchronization may be accomplished between the rotating members to be connected, a simple dog clutch may suffice. However, under certain conditions, the reconnection of a previously disconnected driveline may become more challenging due to rotational speed differences across the power disconnection device. For example, front wheel slip may occur that will result in the front driveline speed being greater than the rotational speed of rear driveline components being driven by the rear wheels. In this case, a speed differential will be realized across the power disconnection device making it difficult or impossible for a dog clutch to be actuated from a non-torque transferring mode to a torque transferring mode. Accordingly, a roller clutch or synchronizer may be implemented at any of the locations depicted as a dog clutch or similar power disconnection device. By implementing the roller clutch or synchronizer, a controller may initiate reconnection and torque transfer once a specified range of speed difference between the two members being connected is met. This control arrangement may result in improved system performance including a reduction in the time required to operate the vehicle in one of the drive modes.

Figure 2:
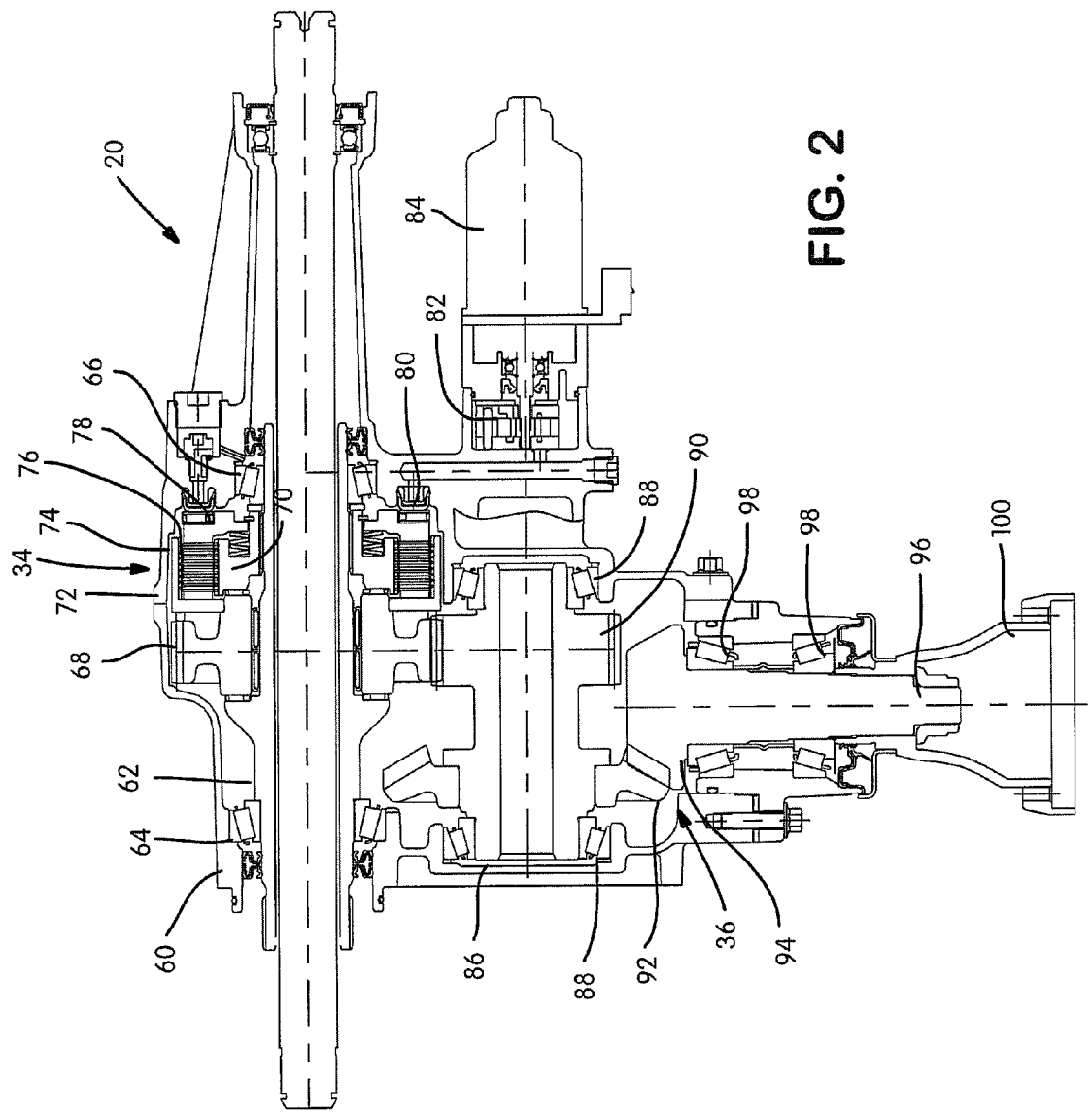
FIG. 2 is a fragmentary cross-sectional view of a dual axis power take-off unit.

FIG. 2 depicts a portion of power take-off unit 20 in greater detail. A housing 60 supports an input shaft 62 for rotation via a bearing 64 and a bearing 66. A drive gear 68 is supported for rotation on input shaft 62. Clutch 34 selectively drivingly interconnects input shaft 62 and drive gear 68. Clutch 34 includes a hub 70 fixed for rotation with input shaft 62. A drum 72 is fixed for rotation with drive gear 68. A plurality of outer clutch plates 74 are fixed for rotation with drum 72. A plurality of inner clutch plates 76 are fixed for rotation with hub 70 and interleaved with outer clutch plates 74. An apply plate 78 is axially translatable to apply a clutch actuation force to clutch plates 74, 76 and transfer torque through clutch 34. An axially moveable piston 80 is in receipt of pressurized fluid provided by a pump 82 driven by an electric motor 84.

A counter shaft 86 is rotatably supported in housing 60 by a pair of bearings 88. Counter shaft 86 includes a driven gear 90 integrally formed thereon in driving meshed engagement with drive gear 68. Right-angled drive assembly 36 includes a ring gear 92 fixed for rotation with counter shaft 86 and a pinion gear 94 in meshed engagement with ring gear 92. Pinion gear 94 is integrally formed with a pinion shaft 96 supported for rotation by a pair of bearings 98. Pinion shaft 96 is fixed for rotation with propeller shaft 38 via a flange 100.

In operation, clutch 34 may be placed in an activated mode where torque is transferred between input shaft 62 and drive gear 68. Depending on the pressure generated by pump 82, the torque transferred by clutch 34 may be varied. Accordingly, the quantity of torque transferred to rear driveline 14 may also be varied. Clutch 34 is also operable in a deactivated mode where no torque is transferred to rear driveline 14. Power from engine 16 is not transferred to right-angled drive assembly 36 when clutch 34 is in the deactivated mode.

Figure 3:
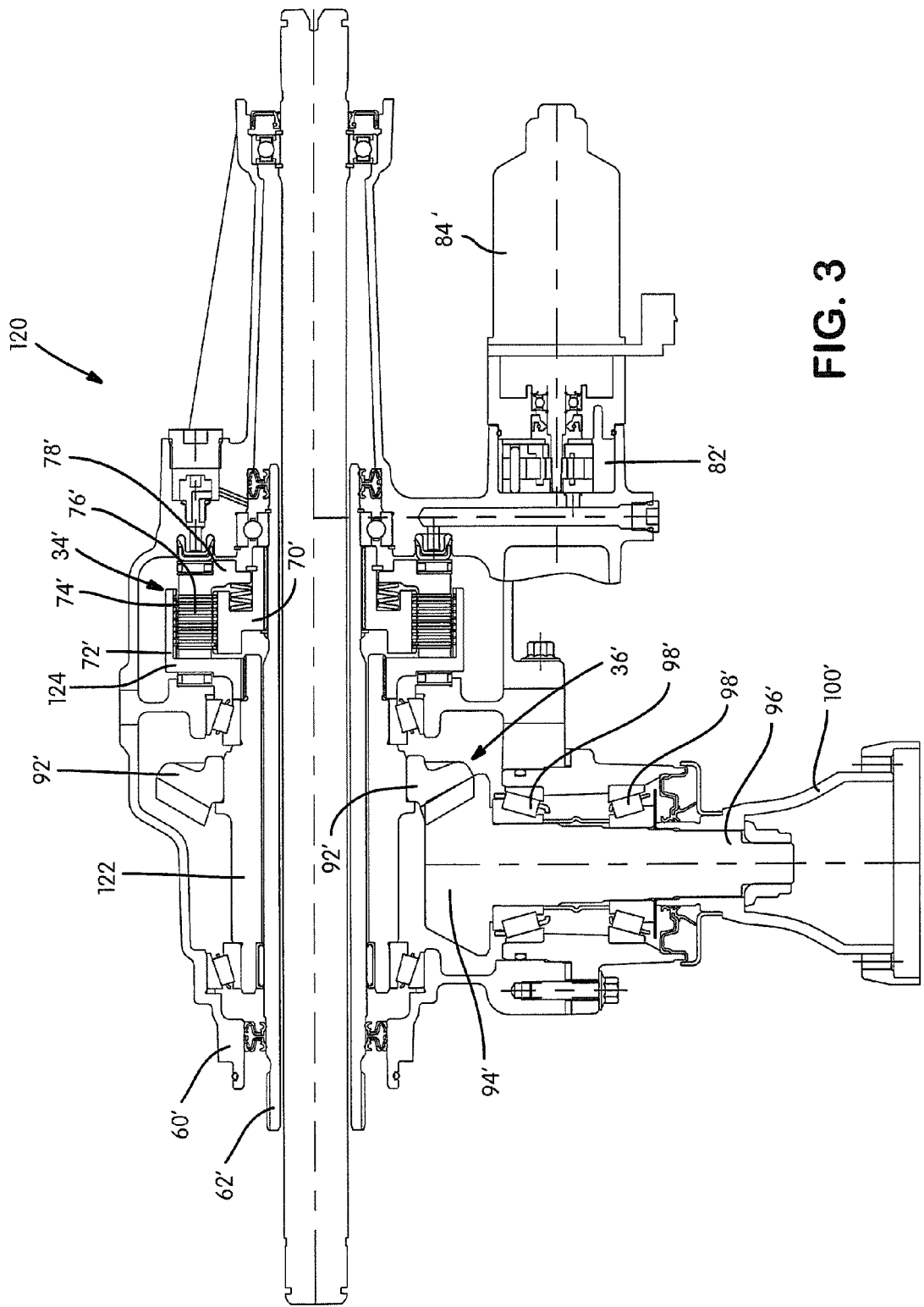
FIG. 3 is a fragmentary cross-sectional view of a single axis power take-off unit.

FIG. 3 depicts a portion of an alternate power take-off unit 120 that may be used within drive train 10 in lieu of power take-off unit 20. Power take-off unit 120 is substantially similar to power take-off unit 20. As such, like elements will be identified with the previously introduced reference numerals including a prime suffix. Power take-off unit 120 differs from power take-off unit 20 by being a single axis power transmission device that does not include counter shaft 86, previously described. On the contrary, power take-off unit 120 includes a concentric shaft 122 having ring gear 92' fixed thereto. Clutch 34' includes hub 70' fixed for rotation with input shaft 62'. A drum 124 is fixed for rotation with concentric shaft 122.

Power take-off unit 120 is operable to selectively transfer a desired quantity of torque to rear driveline 14. This task is accomplished in the same manner as previously described in relation to power take-off unit 20. In particular, clutch 34' may be selectively actuated to transmit a desired quantity of torque through selective actuation of electric motor 84' driving pump 82'. Right-angled drive assembly 36' may be drivingly disconnected from input shaft 62' by placing clutch 34' in the deactivated mode.

Figure 4:
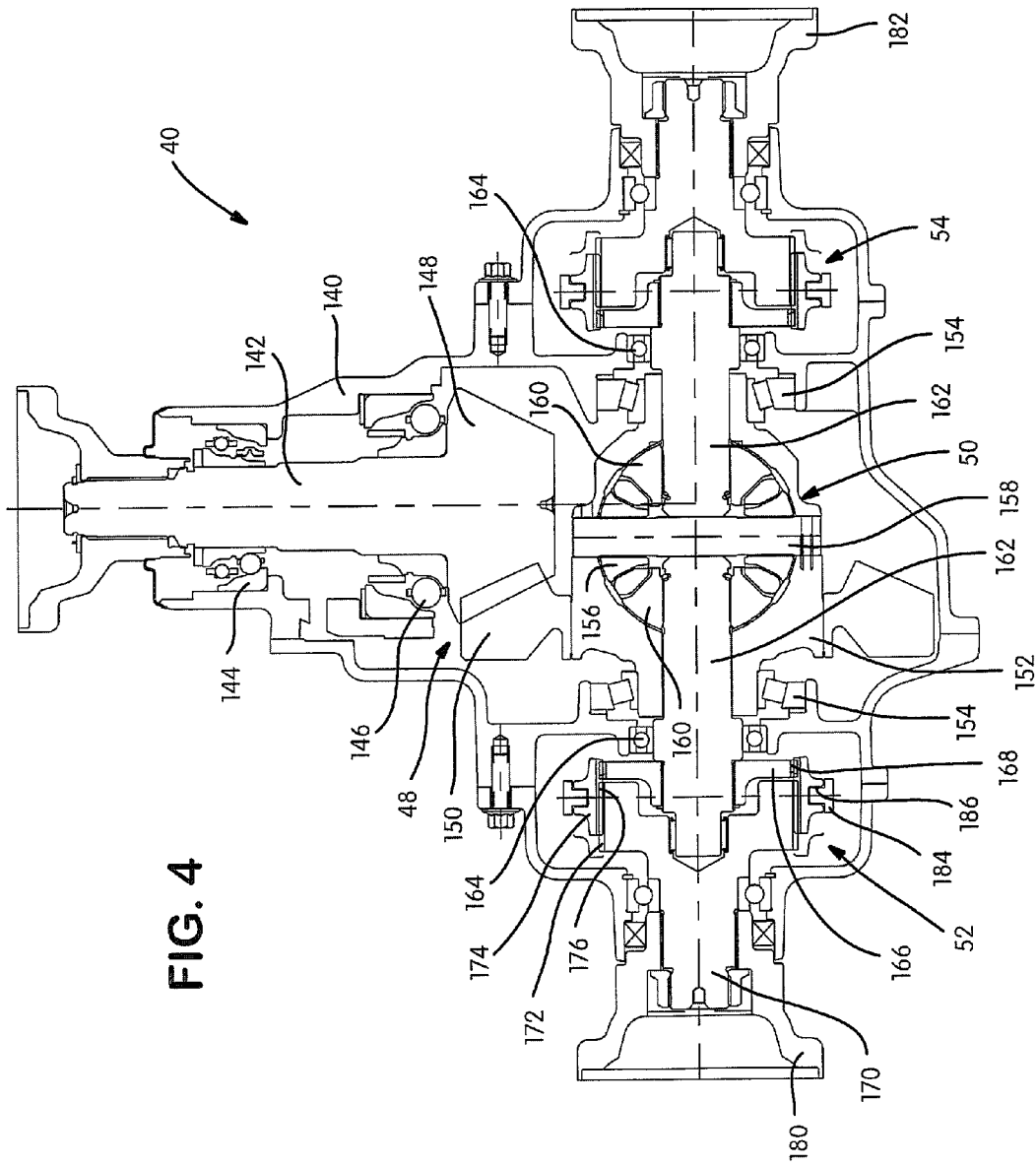
FIG. 4 is a fragmentary cross-sectional view of a rear axle assembly.

FIG. 4 depicts a portion of rear axle assembly 40. A housing 140 rotatably supports a pinion shaft 142 of ring and pinion gearset 48 via bearings 144, 146. A pinion gear 148 is integrally formed with pinion shaft 142. Ring and pinion gearset 48 also includes a ring gear 150 in meshed engagement with pinion gear 148 and fixed for rotation with a carrier 152. Carrier 152 is rotatably supported within housing 140 by bearings 154. Differential assembly 50 includes a pair of pinion gears 156 supported on a cross pin 158 fixed to carrier 152. A pair of side gears 160 are in meshed engagement with pinion gears 156. Side gears 160 are fixed for rotation with stub shafts 162. Bearings 164 rotatably support stub shafts 162 within housing 140.

Disconnect 52 is substantially similar to disconnect 54. Each disconnect includes a drive flange 166 fixed for rotation with its associated stub shaft 162. A plurality of external circumferentially spaced apart teeth 168 are formed on drive flange 166. A driven spindle 170 is rotatably supported on a distal end of stub shaft 162. A plurality of external circumferentially spaced apart teeth 172 are formed on driven spindle 170. A sleeve 174 includes a plurality of internal teeth 176. Sleeve 174 is axially moveable between a connected and a disconnected position. In the disconnected position, teeth 176 of sleeve 174 engage only teeth 172 of spindle 170. In the connected position, teeth 176 concurrently engage both teeth 172 of spindle 170 and teeth 168 formed on drive flange 166.

Output flanges 180, 182 drivingly couple spindles 170 with first and second rear axle shafts 44, 46, respectively. A shift fork 184 engages a groove 186 formed in sleeve 174. An actuator (not shown) axially translates shift fork 184 to position sleeve at one of the connected position and the disconnected position. In the connected position, torque is transferred between drive flange 166 and spindle 170 by sleeve 174. In the disconnected position, sleeve 174 does not drivingly engage drive flange 166 and torque is not transferred between stub shaft 162 and spindle 170.

During vehicle operation, it may be advantageous to reduce the churning losses associated with driving ring and pinion gearset 48 and right-angled drive assembly 36. A controller 190 is in communication with a variety of vehicle sensors 192 providing data indicative of parameters such as vehicle speed, four-wheel drive mode, wheel slip, vehicle acceleration and the like. At the appropriate time, controller 190 outputs a signal to control motor 84 or 84' to place clutch 34 in the deactuated mode where torque is not transferred from engine 16 to rear driveline 14. Controller 190 also signals the actuators associated with disconnect 52 and disconnect 54 to place shift forks 184 into their disconnected positions such that energy associated with rotating rear wheels 42 will not be transferred to ring and pinion gearset 48 or differential assembly 50. Accordingly, the hypoid gearsets do not rotate at the rotational output speed of differential assembly 32, nor do they rotate at the rotational speed of rear wheels 42. The hypoid gearsets are disconnected from all sources of power and are not driven at all.

Figure 5:
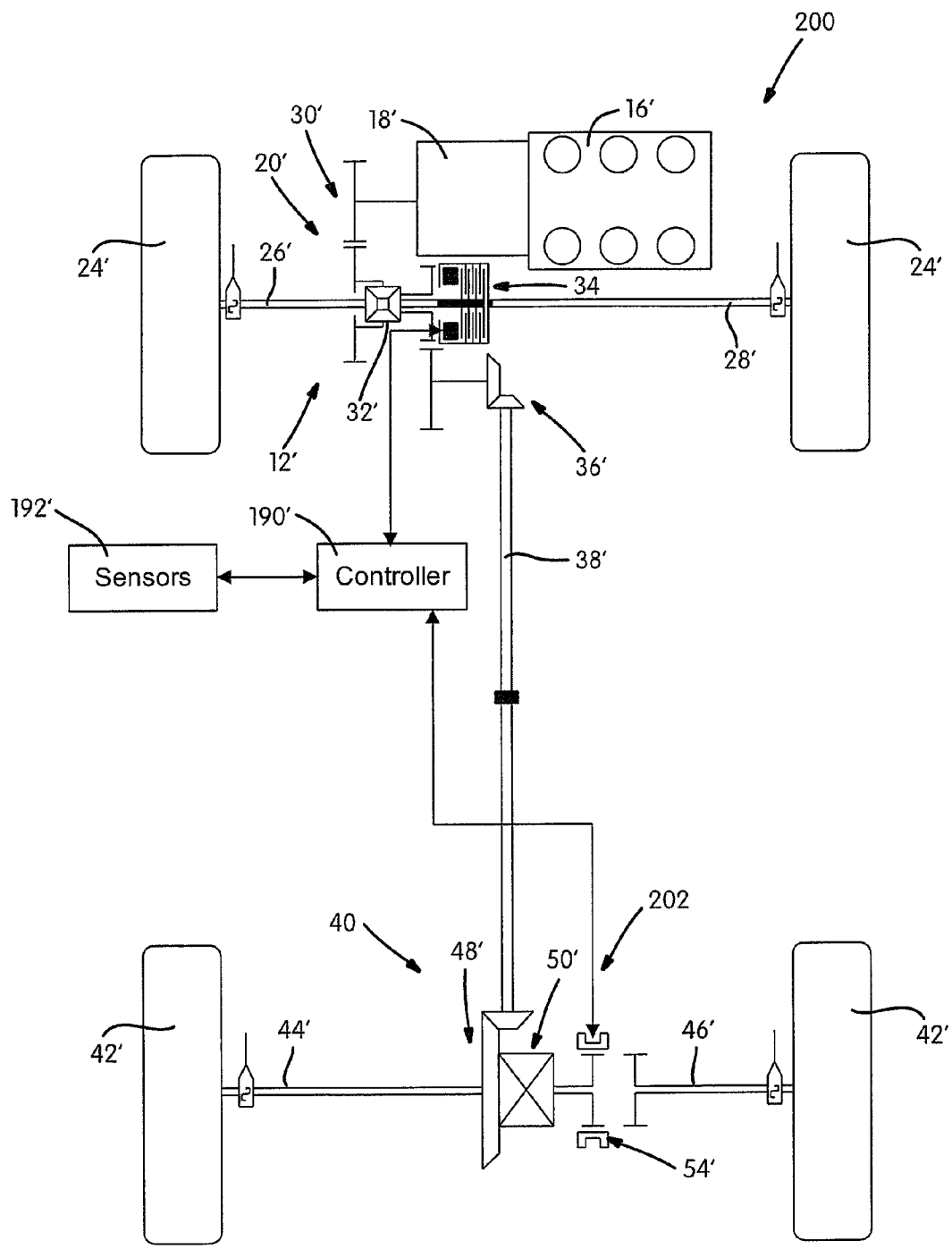
FIG. 5 is a schematic of another exemplary vehicle equipped with an alternate drive train.

FIG. 5 depicts an alternate drive train at reference numeral 200. Drive train 200 is substantially similar to drive train 10. Accordingly, like elements will retain their previously introduced reference numerals including a prime suffix. Drive train 200 differs from drive train 10 in that a rear axle assembly 202 includes a single disconnect 54' instead of the dual disconnect arrangement previously described.

Figure 6:
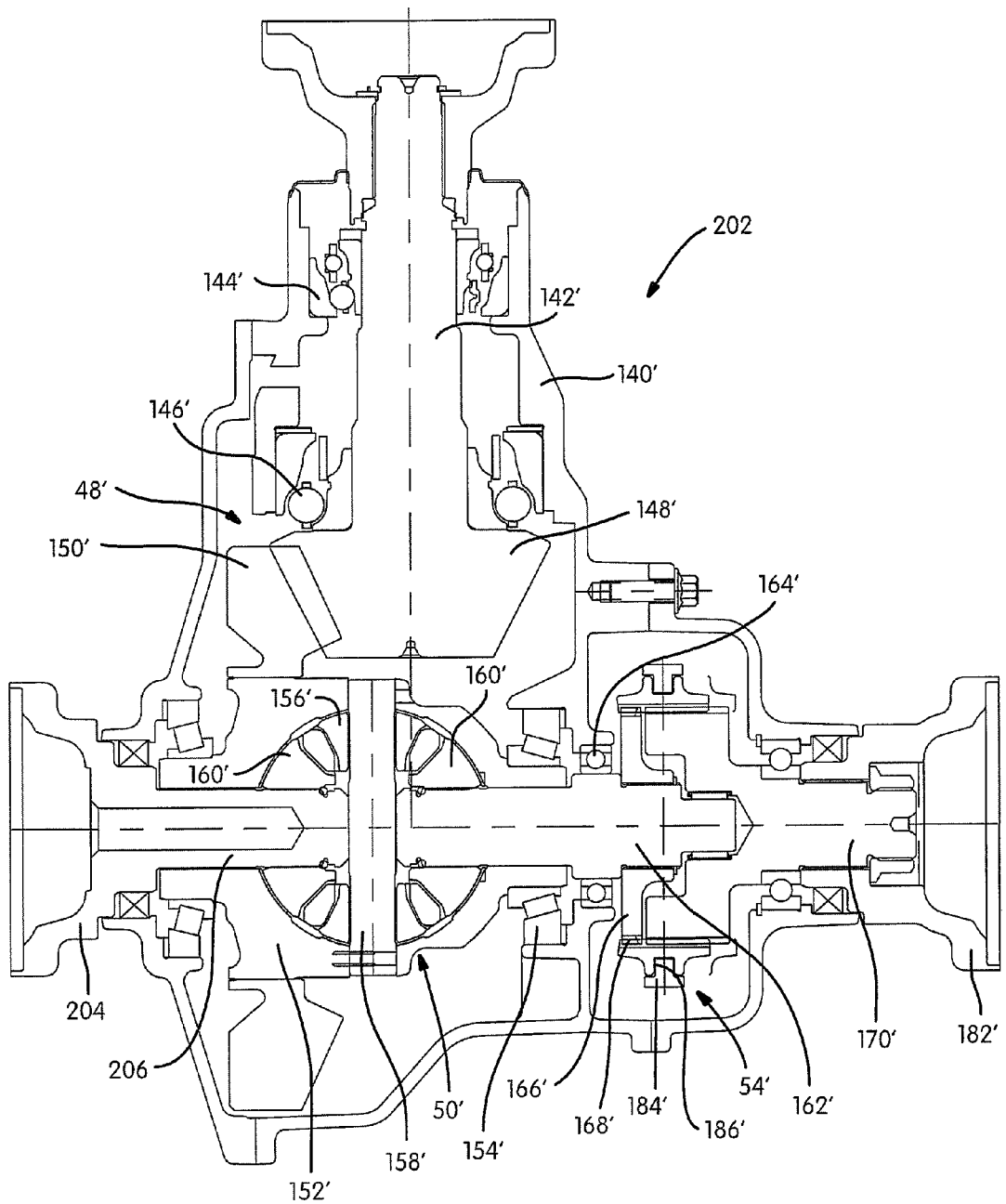
FIG. 6 is a fragmentary cross-sectional view of another rear axle assembly.

FIG. 6 provides an enlarged view of a portion of rear axle assembly 202. Rear axle assembly 202 is substantially similar to rear axle assembly 40. Accordingly, like elements will retain their previously introduced reference numerals including a prime suffix. The output from the side of differential assembly 50' associated with second rear axle shaft 46' is substantially similar to that previously described in reference to rear axle assembly 40. The other output from differential assembly 50' includes a spindle 204 including a splined shaft portion 206 fixed for rotation with one of side gears 160'.

In operation, churning losses may be avoided by operating drive train 200 to cease the transfer of torque through active clutch 34' and place disconnect 54' in the disconnect position. At this time, ring and pinion gearset 48' and right-angled drive assembly 36' are not driven. However, because only a single disconnect is implemented in rear axle assembly 202, energy transfers from the rear wheel 42' that is not equipped with a disconnect to differential assembly 50'. The resistance to rotating ring and pinion gearset 48', propeller shaft 38' and right-angled drive assembly 36' is greater than the energy required to rotate side gears 160' and pinion gears 156'. Accordingly, the gears of differential assembly 50' will rotate while the hypoid gearset members are not driven. As such, churning losses are avoided in this arrangement as well.

Figure 7:
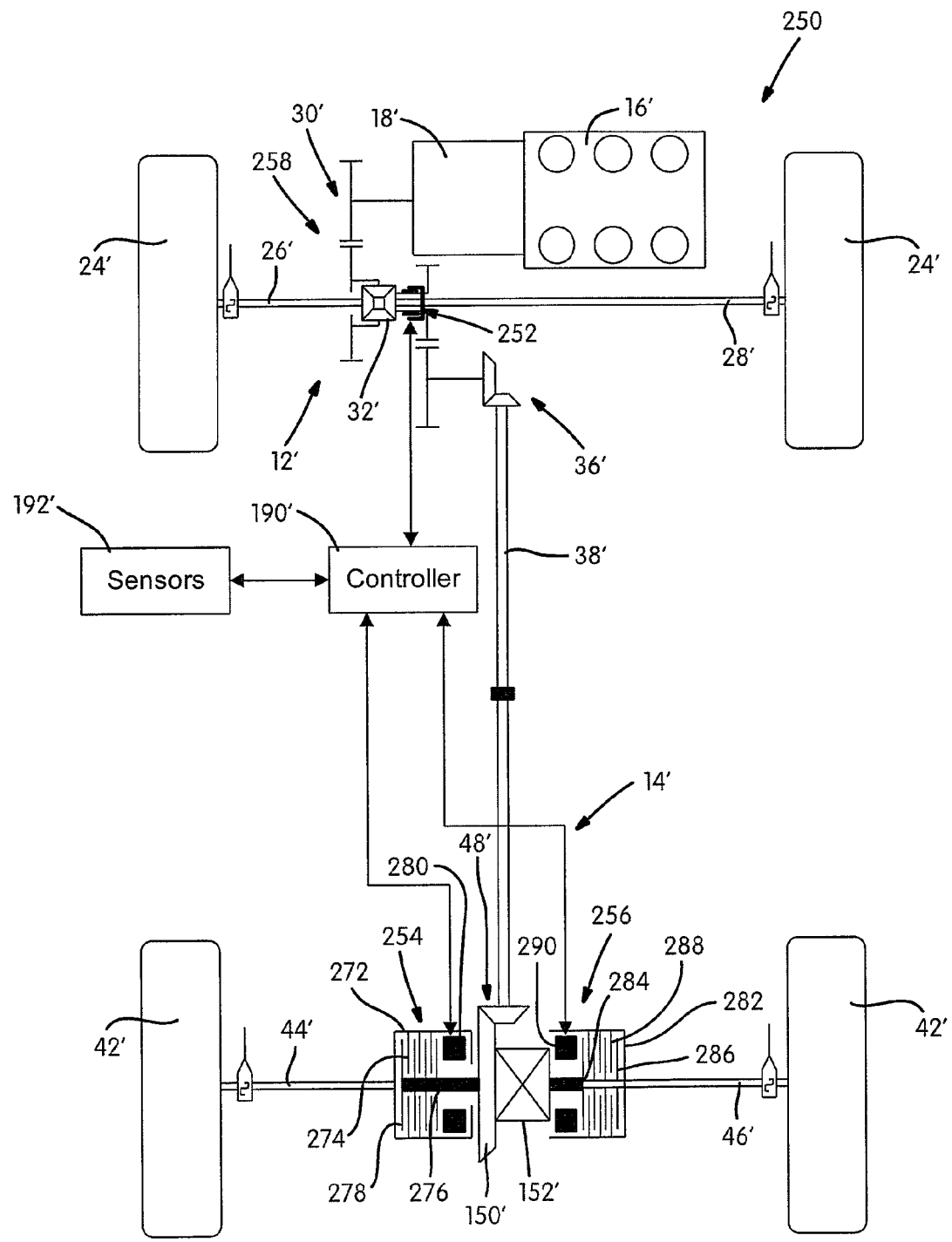
FIG. 7 is a schematic of another exemplary vehicle equipped with another alternate drive train.

FIG. 7 depicts another alternate drive train identified at reference numeral 250. Drive train 250 is substantially similar to drive train 10. As such, like elements will retain their previously introduced reference numerals including a prime suffix. Drive train 250 includes a dog clutch, a dog clutch and synchronizer combination or another mechanical disconnect 252 in place of active clutch 34. A first active clutch 254 replaces disconnect 52. A second active clutch 256 replaces disconnect 54. The remaining components of drive train 250 are substantially the same as those previously described in relation to drive train 10.

Figure 8:
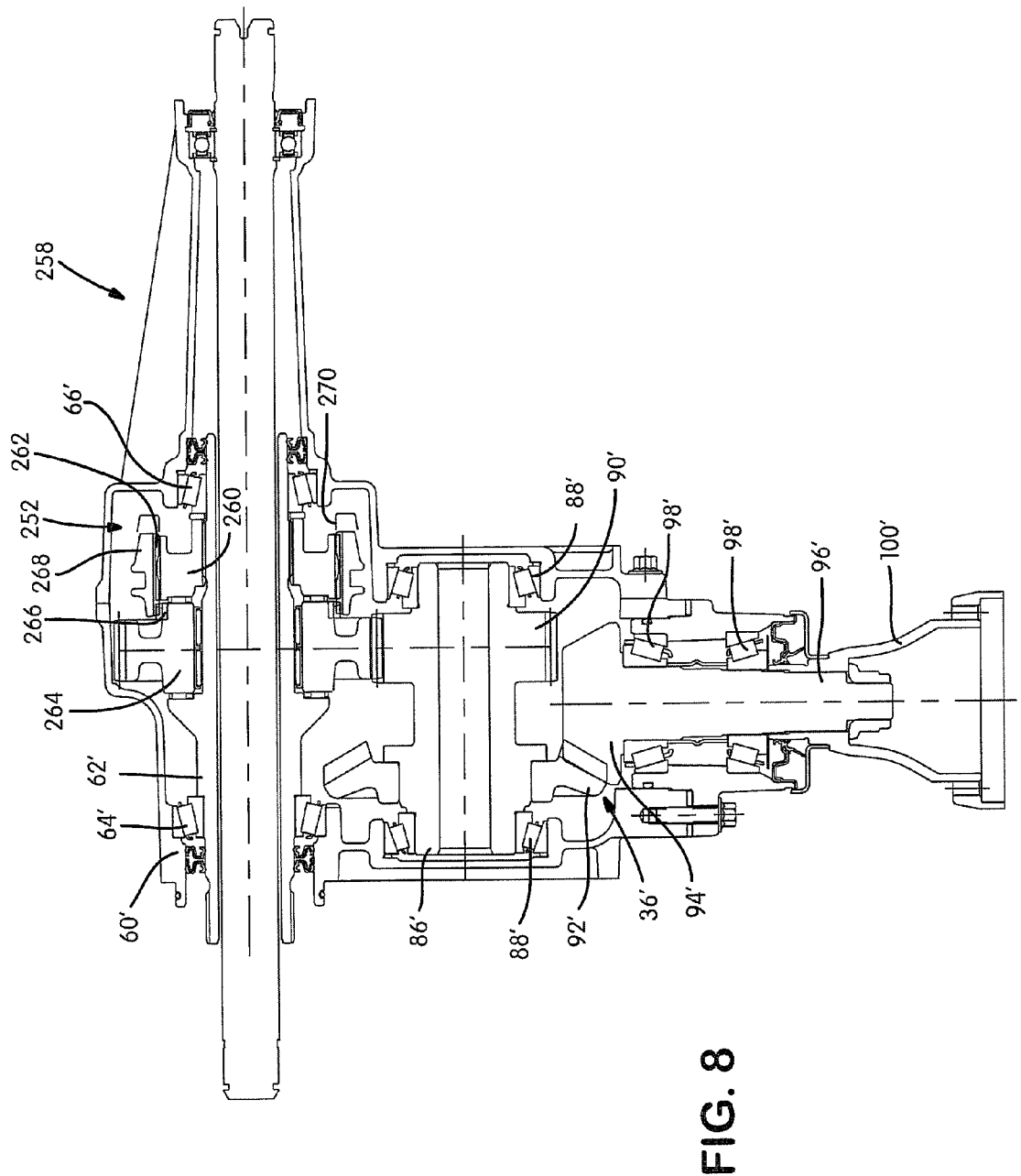
FIG. 8 is a fragmentary cross-sectional view of another dual axis power take-off unit.

FIG. 8 depicts a power transmission unit 258 including dog clutch or dog clutch/synchronizer 252. Power take-off unit 258 is a dual axis type as previously described in relation to FIG. 2. Dog clutch 252 includes a hub 260 fixed for rotation with input shaft 62'. Hub 260 includes a plurality of external circumferentially spaced apart teeth 262. A drive gear 264 is rotatably supported on input shaft 62' and is in meshed engagement with gear 90'. A plurality of clutch teeth 266 are also formed on drive gear 264. A sleeve 268 includes a plurality of inner teeth 270 selectively drivably engageable with teeth 262 and teeth 266. Sleeve 268 is moveable between a disconnected position and a connected position. In the disconnected position, sleeve 268 is axially shifted to the right where teeth 270 engage only teeth 262. Torque is not transferred between hub 260 and drive gear 264. In the connected position, sleeve 268 is axially translated to a left-most position where teeth 270 engage both teeth 262 and teeth 266. At this time, drive gear 264 is fixed for rotation with hub 260 and input shaft 62'. Torque is transferred to rear driveline 14'.

Figure 9:
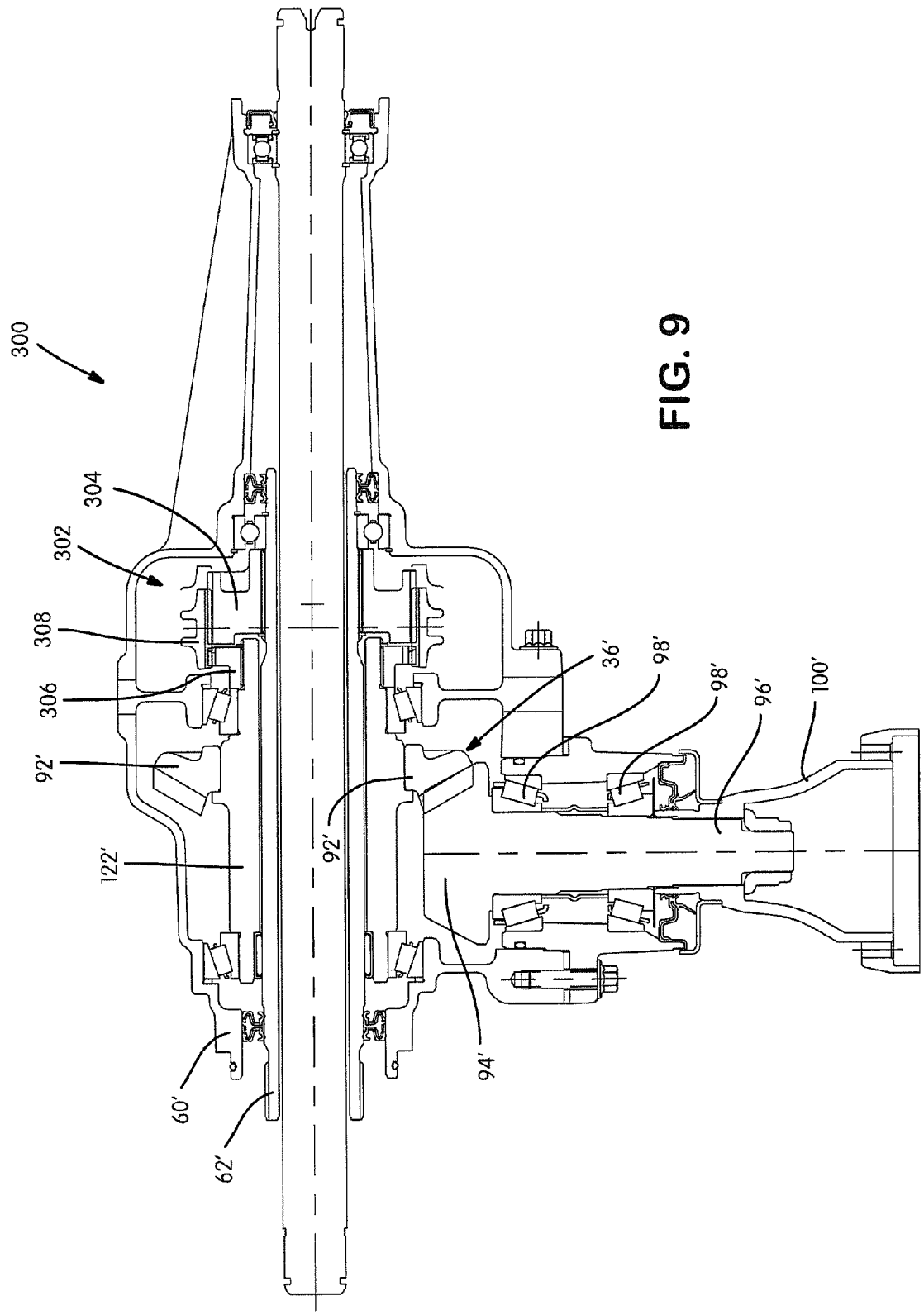
FIG. 9 is a fragmentary cross-sectional view of another single axis power take-off unit.

FIG. 9 depicts an alternate power take-off unit 300 that is substantially similar to power take-off unit 120 except that active clutch 34' is replaced with a dog clutch 302. Dog clutch 302 includes a hub 304 fixed for rotation with input shaft 62'. A drive ring 306 is fixed for rotation with concentric shaft 122'. A sleeve 308 is axially moveable between a connected position where hub 304 is drivingly coupled to drive ring 306 and a disconnected position where sleeve 308 is only in contact with hub 304. In the disconnected position, torque is not transferred between hub 304 and drive ring 306. It should be appreciated that drive train 250 may be equipped with either power take-off unit 258 or power take-off unit 300 without departing from the scope of the present disclosure. Furthermore, a synchronizer may be added to work in conjunction with dog clutch 302.

Referring once again to FIG. 7, first clutch 254 includes a drum 272 fixed for rotation with first rear axle shaft 44'. A plurality of outer clutch plates 274 are fixed for rotation with drum 272. A shaft 276 is fixed to ring gear 150'. A plurality of inner clutch plates 278 are fixed for rotation with shaft 276. Inner clutch plates 278 are interleaved with outer clutch plates 274. An actuator 280 is selectively operable to apply an actuation force to the inner and outer clutch plates 278, 274 to cause torque to be transferred through first clutch 254. First rear axle shaft 44' is drivingly coupled to ring gear 150' at this time.

Second clutch 256 includes a drum 282 fixed for rotation with second rear axle shaft 46'. Carrier 152' is fixed for rotation with ring gear 150'. A hub 284 is also fixed for rotation with carrier 152'. A plurality of inner clutch plates 286 are axially moveable relative to and fixed for rotation with hub 284. A plurality of outer clutch plates 288 are interleaved with inner clutch plates 286 and fixed for rotation with drum 282. An actuator 290 is selectively operable to apply an actuation force to cause torque transfer from hub 284 to drum 282. In operation, drive train 250 may function to disconnect right-angled drive assembly 36' and ring and pinion gearset 48' from driving connection with engine 16' and driven wheels 24', 42'. To accomplish this task, dog clutch 252 is placed in the disconnected position while first clutch 254 and second clutch 256 are controlled to not transfer torque therethrough. The provision of first clutch 254 and second clutch 256 also facilitates synchronization of hub 260 with drive gear 264 to allow operation of dog clutch 252 or dog clutch 302 without the use of a synchronizer.

Figure 10:
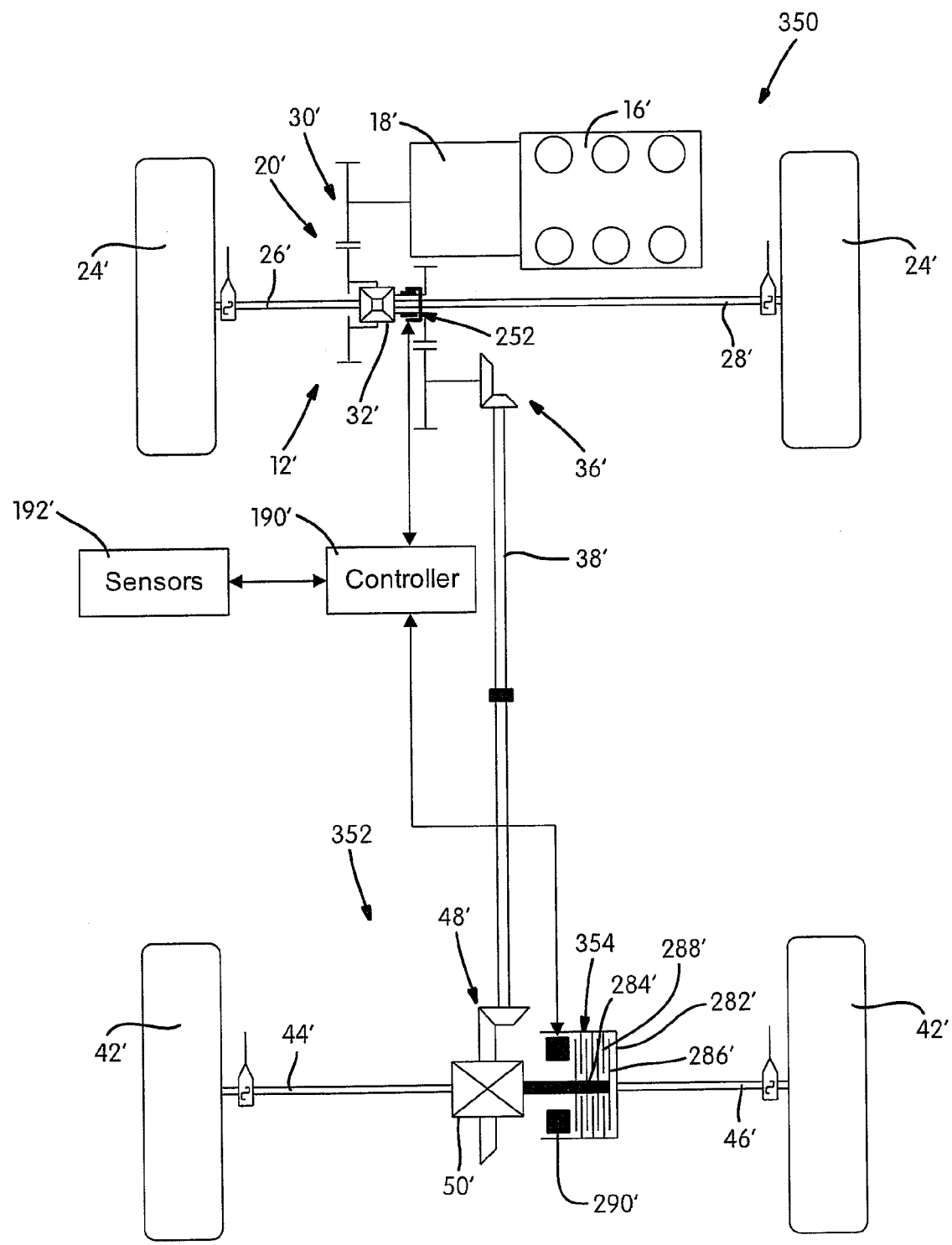
FIG. 10 is a schematic of another exemplary vehicle equipped with another alternate drive train.

FIG. 10 provides a schematic of another alternative drive train 350. Drive train 350 is substantially similar to drive train 250 except that a rear axle assembly 352 is equipped with a single shaft-to-shaft clutch 354 instead of the dual active clutch arrangement previously described.

Figure 11:
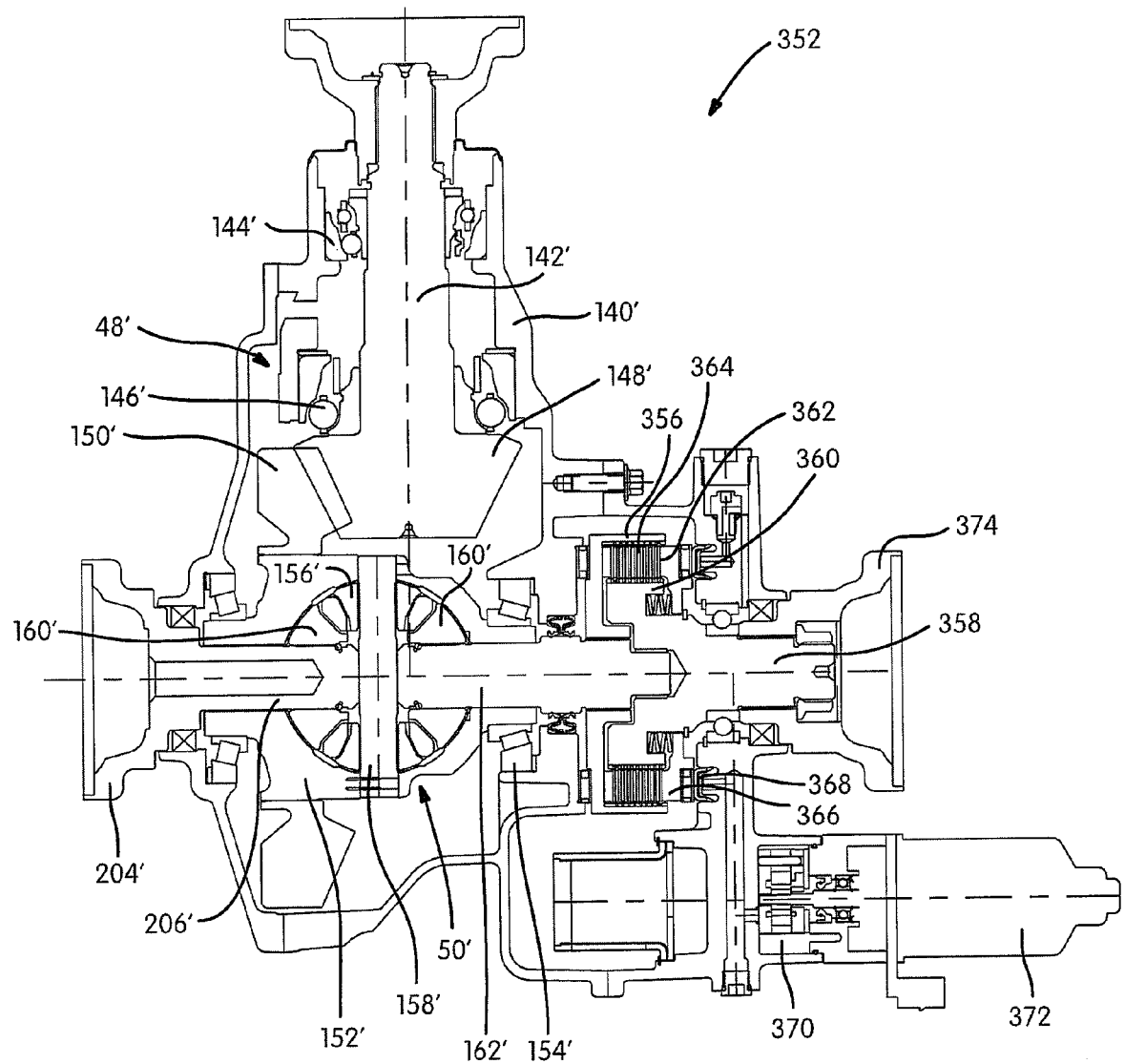
FIG. 11 is a fragmentary cross-sectional view of another rear axle assembly.

FIG. 11 provides a detailed view of rear axle assembly 352 including a stub shaft 162' fixed for rotation with one of side gears 160'. Clutch 354 includes a drum 356 fixed for rotation with stub shaft 162'. An output spindle 358 has a hub 360 integrally formed thereon. A plurality of inner clutch plates 362 are axially moveable relative to and fixed for rotation with hub portion 360. A plurality of outer clutch plates 364 are axially moveable relative to and fixed for rotation with drum 356. Outer clutch plates 364 are interleaved with inner clutch plates 362. An apply plate 366 is axially moveable to apply an actuation force to inner and outer clutch plates 362, 364. An axially moveable piston 368 selectively applies an actuation force to apply plate 366 based on a supply of pressurized fluid from a pump 370 driven by an electric motor 372. Other force multiplying devices such as gears, ball ramps and screws may be used in combination with or in replacement of the pump and piston arrangement depicted. An output flange 374 is fixed for rotation with one end of output spindle 358. Second rear axle shaft 46' (FIG. 10) is coupled to the other end.

Figure 12:
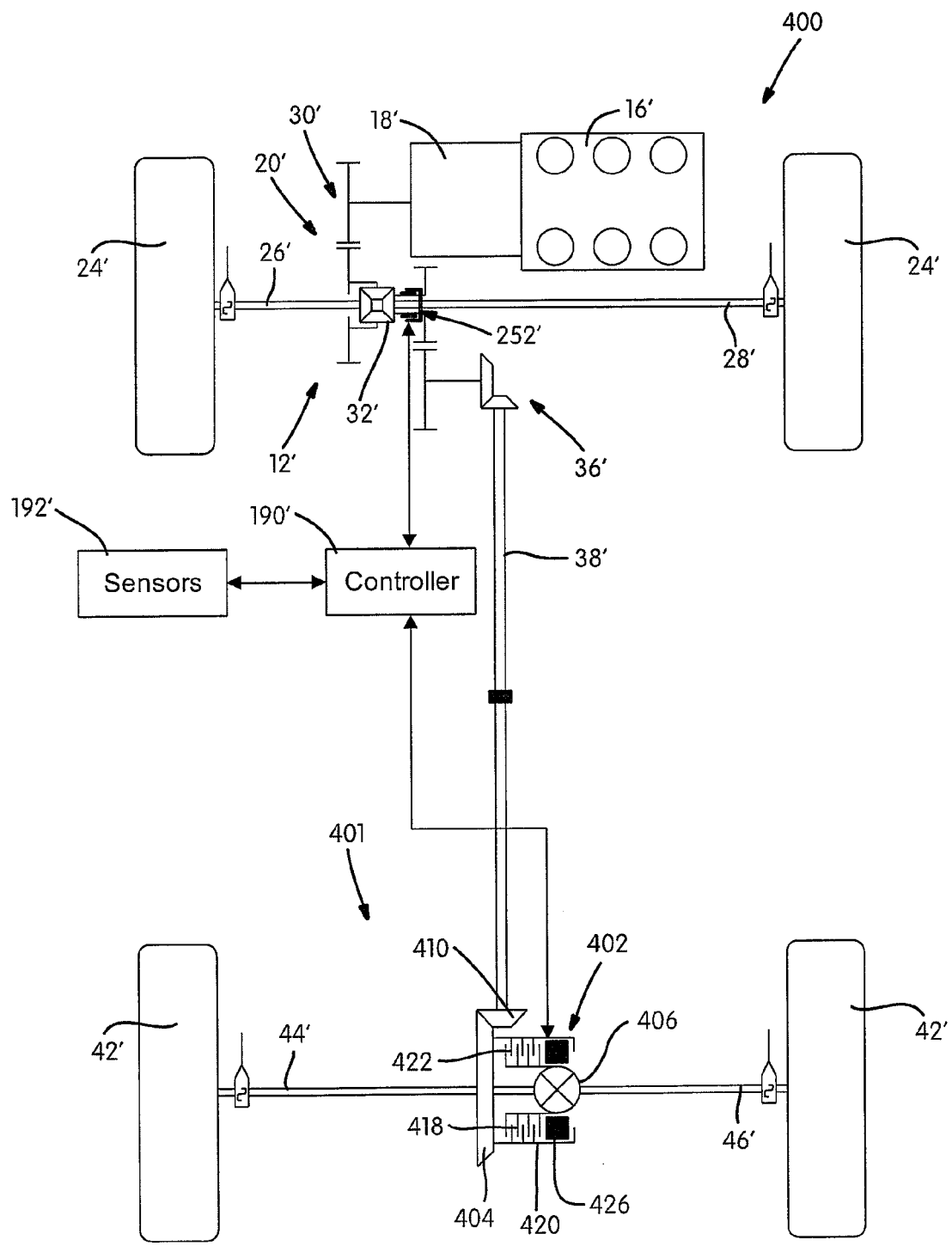
FIG. 12 is a schematic of another exemplary vehicle equipped with another alternate drive train.

Referring to FIG. 12, another alternate drive train is identified at reference numeral 400. Drive train 400 is substantially similar to drive train 350. Drive train 400 includes a rear axle assembly 401 having a plate clutch 402 selectively drivingly coupling a ring gear 404 to a differential carrier 406.

Figure 13:
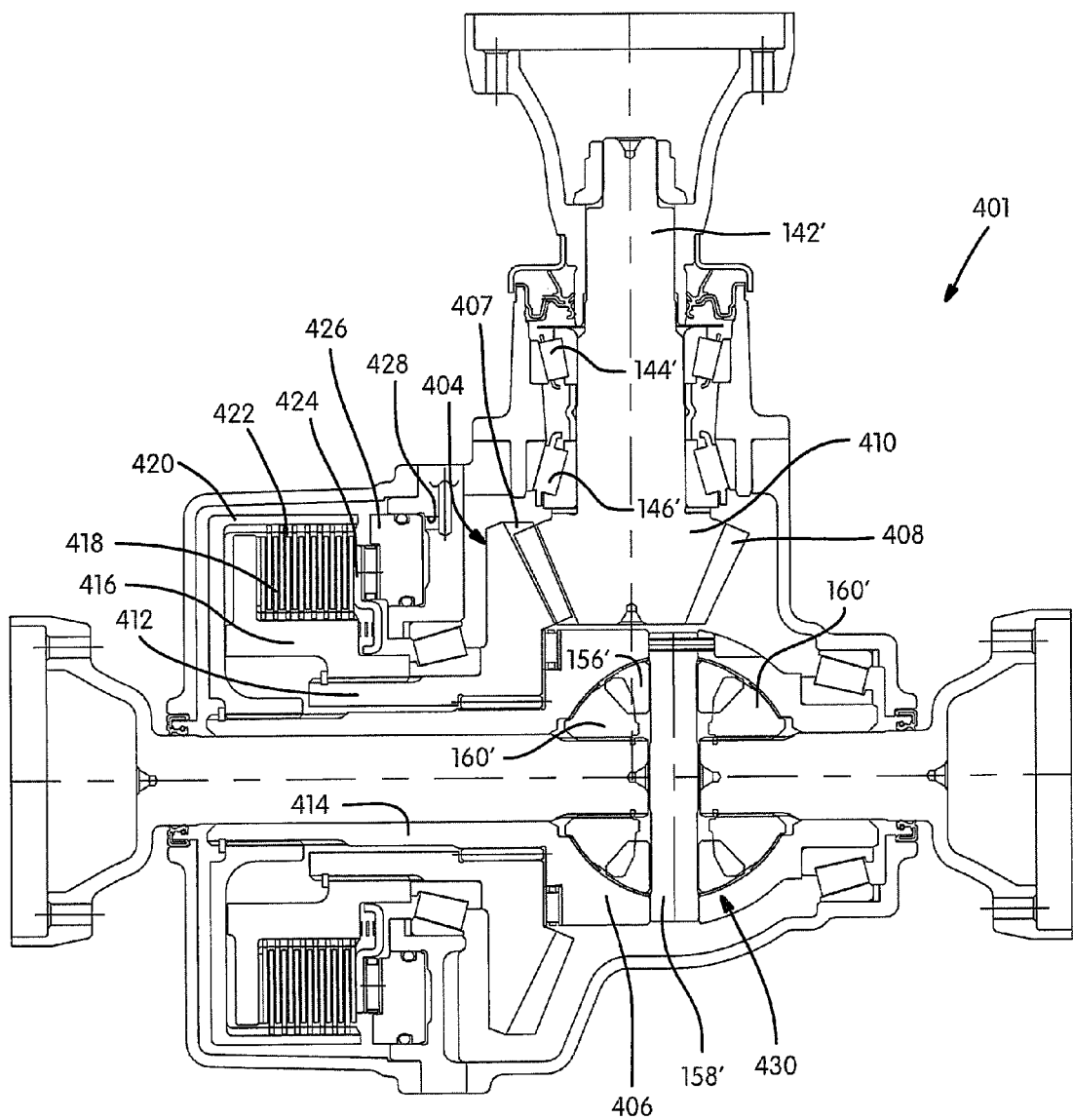
FIG. 13 is a fragmentary cross-sectional view of another rear axle assembly.

FIG. 13 depicts rear axle assembly 401 in greater detail. Ring gear 404 includes a plurality of teeth 407 in meshed engagement with teeth 408 of a pinion gear 410. Ring gear 404 includes a hub portion 412 supported for rotation on a cylindrical sleeve portion 414 of differential carrier 406.

Clutch 402 includes a hub 416 fixed for rotation with hub portion 412 of ring gear 404. A plurality of inner clutch plates 418 are fixed for rotation with hub 416. A drum 420 is fixed for rotation with sleeve portion 414 of carrier 406. A plurality of outer clutch plates 422 are axially moveable relative to and fixed for rotation with drum 420. An apply plate 424 is axially moveable to apply a clutch actuation force to inner clutch plates 418 and outer clutch plates 422 to transfer torque through clutch 402. A piston 426 is axially moveable to apply a force proportional to a pressure of fluid positioned within a port 428 and acting on piston 426. Pressurized fluid may be provided by any number of sources including an electric motor driven pump as previously described.

When pressurized fluid is provided to act on piston 426, torque is transferred between ring gear 404 and carrier 406. When it is desirable to assure that ring gear 404 and pinion gear 410 are not driven by rear wheels 42' (FIG. 12), clutch 402 is placed in an open mode. Torque transferred from the wheels into a differential gearset 430 positioned within carrier 406 will not drive ring gear 404.

Figure 14:
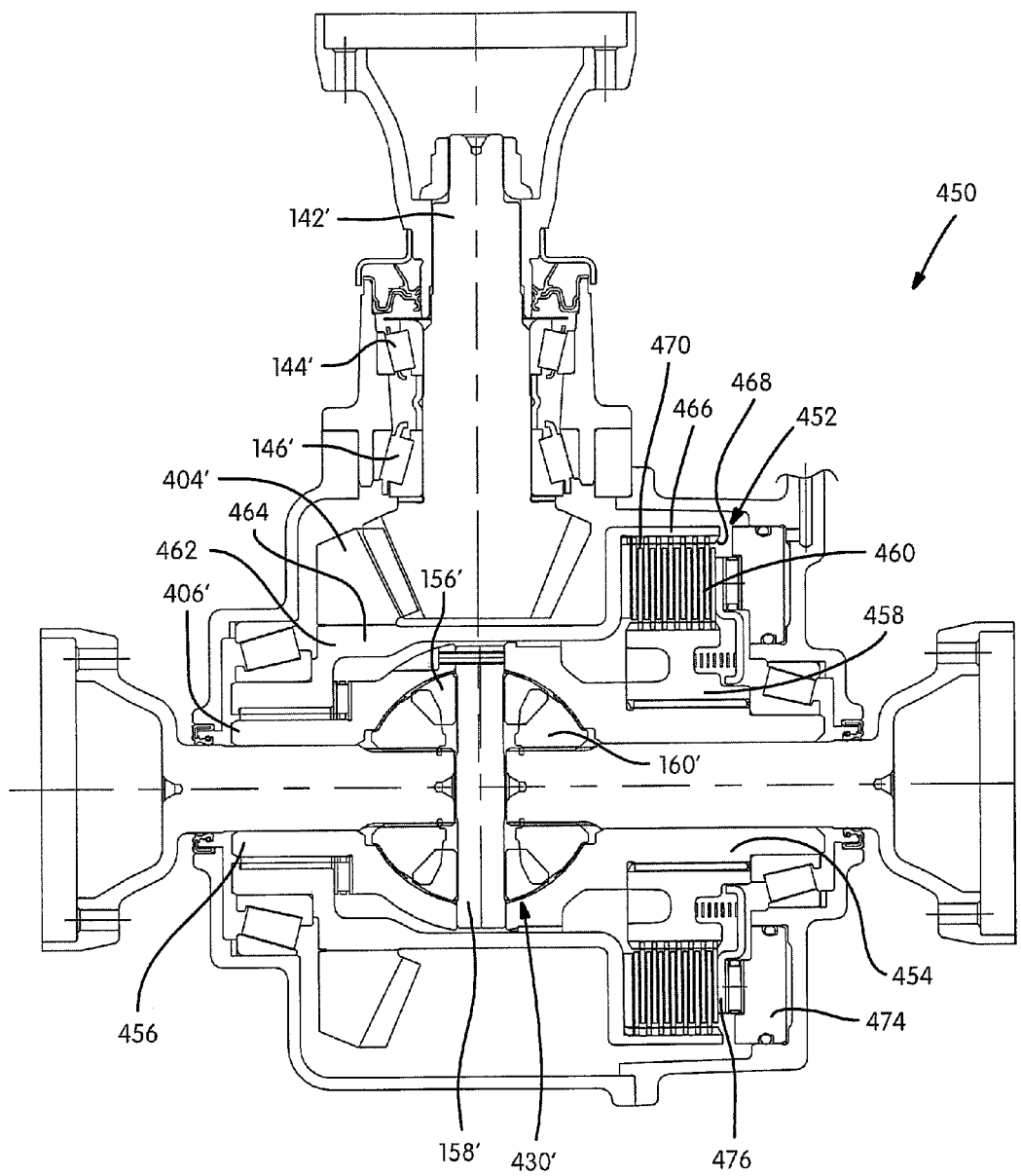
FIG. 14 is a fragmentary cross-sectional view of another rear axle assembly.

FIG. 14 shows a portion of an alternate rear axle assembly 450 substantially similar to rear axle assembly 401. Rear axle assembly 450 differs from rear axle assembly 401 in the manner in which a clutch 452 selectively drivingly interconnects ring gear 404' with differential carrier 406'. Differential carrier 406' includes a first axially extending journal 454 and a second axially extending journal 456 located on the opposite side of differential gearset 430'. Clutch 452 includes a hub 458 splined for rotation with first journal 454. A plurality of inner clutch plates 460 are axially moveable relative to and fixed for rotation with hub 458. A stepped drum 462 is supported for rotation on second journal 456 of carrier 406'. Ring gear 404' is mounted to a first stepped portion 464 of stepped drum 462. A second stepped portion 466 includes an internal spline 468. A plurality of outer clutch plates 470 are fixed for rotation and axially moveable relative to drum 462 via spline 468. A piston 474 may be pressurized into engagement with an apply plate 476 to provide an actuation force to clutch 452. In the arrangement depicted in FIG. 14, stepped drum 462 envelops a majority of differential carrier 406' and is rotatable relative thereto.

While a number of vehicle drivelines have been previously described, it should be appreciated that the particular configurations discussed are merely exemplary. As such, it is contemplated that other combinations of the components shown in the Figures may be arranged with one another to construct a drive train not explicitly shown but within the scope of the present disclosure.

What is claimed is:

1. A vehicle drive train for transferring torque to first and second sets of wheels, the drive train comprising:
   a first driveline being adapted to transfer torque to the first set of wheels and including a first power disconnection device;
   a second driveline being adapted to transfer torque to the second set of wheels and including a second power disconnection device, wherein the second power disconnection device includes a clutch for selectively connecting separate portions of an axle shaft adapted to drive one of the wheels of the second set of wheels; and
   a hypoid gearset positioned within one of the first driveline and the second driveline in a power path between the first and second power disconnection devices, wherein the hypoid gearset is selectively disconnected from being driven by either of the first driveline and the second driveline when the first and second power disconnection devices are operated in a disconnected, non-torque transferring, mode, wherein the second driveline includes another hypoid gearset driven by the hypoid gearset and positioned in the power path between the first and second power disconnection devices.

2. The vehicle drive train of claim 1 wherein the first power disconnection device is positioned within a power take-off unit and includes a multi-plate clutch.

3. The vehicle drive train of claim 2 wherein the first driveline includes a differential gearset having an output coupled to the multi-plate clutch.

4. The vehicle drive train of claim 1 further including a third power disconnection device including a clutch for selectively connecting separate portions of another axle shaft adapted to drive the other of the wheels of the second set of wheels.

5. A vehicle drive train for transferring torque from a power source to first and second sets of wheels, the drive train comprising:
- a first driveline adapted to transfer torque from the power source to the first set of wheels and including a power take-off unit, the power take-off unit including a hypoid gearset and a first power disconnection device selectively ceasing the transfer of torque to the hypoid gearset; and
- a second driveline in receipt of torque from the hypoid gearset, the second driveline transferring torque to the second set of wheels and including a second power disconnection device selectively interrupting a transfer of torque from the second set of wheels to the hypoid gearset, wherein the power take-off unit includes a drive gear rotatably supported on an input shaft, the first power disconnection device including a clutch having a hub fixed for rotation with the input shaft, a drum fixed for rotation with the drive gear and a plurality of clutch plates alternatively fixed for rotation with the hub and the drum, the power take-off unit also including an output shaft driving at least one of the wheels of the first set of wheels and rotating about a common axis with the input shaft.

6. A vehicle drive train for transferring torque from a power source to first and second sets of wheels, the drive train comprising:
- a first driveline adapted to transfer torque from the power source to the first set of wheels and including a power take-off unit, the power take-off unit including a hypoid gearset and a first power disconnection device selectively ceasing the transfer of torque to the hypoid gearset; and
- a second driveline in receipt of torque from the hypoid gearset, the second driveline transferring torque to the second set of wheels and including a second power disconnection device selectively interrupting a transfer of torque from the second set of wheels to the hypoid gearset, wherein the power take-off unit includes a drive gear rotatably supported on an input shaft, the first power disconnection device including a clutch having a hub fixed for rotation with the input shaft, a drum fixed for rotation with the drive gear and a plurality of clutch plates alternatively fixed for rotation with the hub and the drum, wherein the power take-off unit includes a countershaft having a driven gear in meshed engagement with the drive gear, a ring gear of the hypoid gearset being fixed for rotation with the countershaft.

7. The vehicle drive train of claim 6 wherein the power take-off unit includes a pump supplying pressurized fluid to a piston applying an actuation force to the clutch.

8. The vehicle drive train of claim 7 wherein the first driveline includes a differential gearset having an output coupled to the multi-plate clutch.

9. A vehicle drive train for transferring torque from a power source to first and second sets of wheels, the drive train comprising:
- a first driveline adapted to transfer torque from the power source to the first set of wheels and including a power take-off unit, the power take-off unit including a hypoid gearset and a first power disconnection device selectively ceasing the transfer of torque to the hypoid gearset; and
- a second driveline in receipt of torque from the hypoid gearset, the second driveline transferring torque to the second set of wheels and including a second power disconnection device selectively interrupting a transfer of torque from the second set of wheels to the hypoid gearset, wherein the second driveline includes a rear driving axle including a ring and pinion gearset, a differential assembly and the second power disconnection device, the differential assembly including a carrier containing a pair of pinion gears in meshed engagement with a pair of side gears, the carrier being fixed for rotation with a first rotatable member of the second power disconnection device, the ring being fixed for rotation with a second rotatable member of the second power disconnection device, wherein the carrier includes an axially extending journal supporting the ring gear for rotation.

10. A vehicle drive train for transferring torque from a power source to first and second sets of wheels, the drive train comprising:
- a first driveline adapted to transfer torque from the power source to the first set of wheels and including a power take-off unit, the power take-off unit including a hypoid gearset and a first power disconnection device selectively ceasing the transfer of torque to the hypoid gearset; and
- a second driveline in receipt of torque from the hypoid gearset, the second driveline transferring torque to the second set of wheels and including a second power disconnection device selectively interrupting a transfer of torque from the second set of wheels to the hypoid gearset, wherein the second driveline includes a rear driving axle including a ring and pinion gearset, a differential assembly and the second power disconnection device, the differential assembly including a carrier containing a pair of pinion gears in meshed engagement with a pair of side gears, the carrier being fixed for rotation with a first rotatable member of the second power disconnection device, the ring being fixed for rotation with a second rotatable member of the second power disconnection device, wherein the carrier includes opposed axially extending first and second journals, wherein the first journal is fixed for rotation with the first rotatable member and the second journal rotatably supports the second rotatable member.

11. A vehicle drive train for transferring torque from a power source to a first pair and a second pair of wheels, the drive train comprising:
- a first power transmission device adapted to transfer torque from the power source to the first pair of wheels, the first power transmission device including a first hypoid gearset and a first power disconnection device selectively ceasing the transfer of torque to the first hypoid gearset; and
- a second power transmission device in receipt of torque from the first hypoid gearset, the second power transmission device transferring torque to the second pair of wheels and including a second hypoid gearset, a second power disconnection device selectively interrupting a transfer of torque from one of the second wheels to the second hypoid gearset, and a third power disconnection device selectively interrupting a transfer of torque from the other of the second wheels to the second hypoid gearset, wherein the first power transmission device includes an input shaft and an intermediate shaft rotatably supported on the input shaft, the first power disconnection device including a first rotatable member fixed for rotation with the input shaft and a second rotatable member fixed for rotation with the intermediate shaft, a ring gear of the first hypoid gearset being mounted on the intermediate shaft.

12. The vehicle drive train of claim 11 wherein the first power disconnection device includes a first set of clutch plates fixed for rotation with the first rotatable member and a second set of clutch plates fixed for rotation with the second rotatable member.

13. The vehicle drive train of claim 12 wherein the first power transmission device includes an electric motor driving a pump to provide pressurized fluid to a clutch actuator for applying an actuation force to the first and second set of clutch plates.

14. The vehicle drive train of claim 13 wherein the second power transmission device includes a differential assembly having a carrier fixed to a ring gear of the second hypoid gearset, a first stub shaft interconnecting a first output of the differential and the second power disconnection device, and a second stub shaft interconnecting a second output of the differential and the third power disconnection device.

15. The vehicle drive train of claim 14 wherein the second power transmission device includes first and second output shafts adapted to drive the second wheels, the second power disconnection device including a first rotatable clutch member having a first set of external teeth fixed for rotation with the first stub shaft and a second rotatable clutch member having a second set of external teeth fixed for rotation with the first output shaft, an axially translatable sleeve selectively drivingly interconnecting the first and second sets of external teeth.

16. The vehicle drive train of claim 11 wherein the second and third power disconnection devices each include individually controllable plate clutches.

* * * * *